United States Patent
Ishizaki et al.

(10) Patent No.: US 7,197,747 B2
(45) Date of Patent: Mar. 27, 2007

(54) COMPILING METHOD, APPARATUS, AND PROGRAM

(75) Inventors: Kauaki Ishizaki, Tokyo-to (JP); Tatshushi Inagaki, Machida (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/388,024

(22) Filed: Mar. 12, 2003

(65) Prior Publication Data

US 2004/0025152 A1    Feb. 5, 2004

(30) Foreign Application Priority Data

Mar. 13, 2002   (JP)   .............................. 2002-069221

(51) Int. Cl.
*G06F 9/44* (2006.01)

(52) U.S. Cl. ..................... 717/146; 717/151; 717/159

(58) Field of Classification Search ................ 717/106, 717/127, 130–132, 144, 146, 161, 151, 159
See application file for complete search history.

(56) References Cited

U.S. PATENT DOCUMENTS

| | | | | |
|---|---|---|---|---|
| 6,029,002 | A * | 2/2000 | Afifi et al. ................... | 717/131 |
| 6,260,190 | B1 * | 7/2001 | Ju ............................. | 717/156 |
| 6,526,572 | B1 * | 2/2003 | Brauch et al. ............... | 717/154 |
| 6,615,403 | B1 * | 9/2003 | Muthukumar et al. ....... | 717/160 |
| 6,742,108 | B1 * | 5/2004 | Fielden ........................ | 712/207 |
| 6,817,013 | B2 * | 11/2004 | Tabata et al. ................ | 717/151 |
| 2002/0095666 | A1 * | 7/2002 | Tabata et al. ................ | 717/149 |

FOREIGN PATENT DOCUMENTS

JP    PUPA 2000-331427    11/2000

OTHER PUBLICATIONS

Choi et al., "Efficient and precise modeling of exceptions for the analysis of Java programs", Sep. 1999, ACM SIGSOFT Software Engineering Notes , Proceedings of the 1999 ACM SIGPLAN-SIGSOFT workshop on Program analysis for software tools and engineering PASTE '99, vol. 24 Issue 5, p. 21-31.*

(Continued)

*Primary Examiner*—Wei Zhen
*Assistant Examiner*—Philip Wang
(74) *Attorney, Agent, or Firm*—Lisa M. Yamonaco; Anne Vachon Dougherty

(57) ABSTRACT

A method and system for compiling a program written in a type-safe language. Instructions are reordered for speculative execution while reducing the execution time of the program. A dependency graph is generated wherein exception dependent arcs are discriminated from arcs of other dependency types. Determination is made whether earliest execution start time of the H-PEI will be earlier when executed with or without a constraint by the exception dependent arc. If it is determined that it will be earlier in the latter case, the instruction sequence including the H-PEI is reordered for speculative execution.

17 Claims, 15 Drawing Sheets

OTHER PUBLICATIONS

Kazi et al., "Techniques for obtaining high performance in Java programs", Sep. 2000, ACM Computing Surveys (CSUR), vol. 32 Issue 3, p. 213-240.*

Lakshminarayana et al., "Incorporating speculative execution into scheduling of control-flow intensive behavioral descriptions", May 1998, Proceedings of the 35th annual conference on Design automation, p. 108-113.*

Radivojevic et al., "Incorporating speculative execution in exact control-dependent scheduling", Jun. 1994, Proceedings of the 31st annual conference on Design automation, p. 479-484.*

M.D. Smith, M.S. Lam and M.A. Horowitz.. "Boosting Beyond Static Scheduling in a Superscalar Processor". In Procedings of the 17th Annual International symposium on Computer Architecture, pp. 344-354, 1990.

S.A. Mahlke, W.Y. Chen, R.A. Bringmann, R.E. Hank, W.W. Hwu, B.R. Rau, and M.S. Schlansker. Sentinel scheduling: A model for compiler-controlled speculative execution. ACM Transactions on Computer Systems, 11 (4), pp. 376-408, 1993.

D. M. Gallagher . W.Y. Chen , S.A. Mahlke, J.C. Gyllenhall and W.W. Hwu. Dynamic memory disambiguation using the memory conflict buffer. In Proceedings of International Conference on Architectural Support for Programming Langurages and Operating Systems, pp. 183-193, 1994.

M. Arnold, M.S. Saiao, U. Kremer, and B. Ryder. Exploring the interaction between Java's implicitly thrown exceptions and instruction Scheduling. International Journal of Parallel Programming, vol. 29, No. 2, 2001.

Kosei, Komatusu, Fukazawa. A Global Code Scheduling Method and the Evaluation for Parrallel Architecture, Joint Symposium on Parallel Processing 1994, pp. 1-8, 1994.

M. Gupta, JD Choi, and M. Hind. Optimizing Java programs in the presence of exceptions. In Proceeding of the 14th European Conference on Object-Oriented Programming(ECOOP' 00), pp. 422-446, 2000.

* cited by examiner

Fig. 4

```
ih <input>     H-PEI Instructions
is, id:        Instructions
uset:          Set of arc operands
u, uc:         src operand
d:             dst operand uset = src operands(ih)
foreach (u ⊆ uset) {
   foreach (d ⊆ Pred(u)) {
      foreach (uc ⊆ Succ(d)) {
         is = instruction(uc)
         if ("is" is an S-PEI) {
            Provide an exception dependent arc between "is" and "ih"
         }
         id = instruction(d)
         if(id is not an instruction, such as new/newarray/getfield/getstatic, that generates a memory address) {
            uset = uset ∪ src operands(id)
         }
      }
   }
}
```

Fig. 5

```
G <Input>:              Dependency graph
is, ie, i:              Instructions
v[# of instructions(G)]: boolean v = F
foreach (i ⊂ instruction by reverse post order(G)) {
  if (visited(i)) { continue }
  visited[i] = T;
  if("i" is an S-PEI) {
    is = I
    break
  }
} foreach (ie ⊂ succeeding instruction by reverse post order(is))  {
  if (visited(ie)) { continue }
  visited[ie] = T;
  if("ie" is an S-PEI) {
    Provide an exception dependent arc between "is" and "ie"
    is = ie
  }
}
```

Fig. 6
```
Java® source program
int foo() {
  Cls1 a = this.field;
  Cls2 i = a.field2 + 1;
  return i;
}
```
```
Intermediate representation of compiler
N1:add        r2 = r1, 16  // r1 = this
N2:ld         r3 = [r2]
N3:nullcheck  r3
N4:add        r4 = r3, 24
N5:ld         r5 = [r4]
N6:add        r6 = r5, 1
N7:ret        r6
```
```
Intermediate representation of compiler after list
scheduling
N1:add        r2 = r1, 16  // r1 = this
N2:ld         r3 = [r2]
N4:add        r4 = r3, 24
N3:nullcheck  r3
N5:ld         r5 = [r4]
N6:add        r6 = r5, 1
N7:ret        r6
```

Fig. 8

Java® source program

```
int foo(int n, int i) {
    int a[] = new int[n];
    return a[i] + 1;
}
```

First-stage intermediate representation

```
N1: newarray  t1 = n
N2: ld        t2 = [t1] // len
N3: indexcheck i, t2
N4: add       t3 = t1, 16
N5: shadd     t4 = t3, i<<2
N6: ld        t5 = [t4] // a[i]
N7: add       t6 = t5, 1
N8: ret       t6
```

Second-stage intermediate representation

```
N1: newarray   t1 = n
N2: ld         t2 = [t1]
N3: indexcheck i, t2
N4: add        t3 = t1, 16
N5: shadd      t4 = t3, i<<2
N6: ld.s       t5 = [t4]
N7: add        t6 = t5, 1
N8: ret        t6
```

Third-stage intermediate representation after list scheduling

```
N1: newarray   t1 = n
N2: ld         t2 = [t1]
N4: add        t3 = t1, 16
N5: shadd      t4 = t3, t4
N6: ld.s       t5 = [t4]
N7: add        t6 = t5,
N3: indexcheck i, t2
N8: ret        t6
```

Fig. 14

| | Compiler according to the present invention | Compiler according to the prior art |
|---|---|---|
| The number of PDG nodes | 37327 | 142679 |
| The average number of instructions contained in one PDG node | 4.71 | 1.23 |
| The number of arcs between PDG nodes | 54669 | 262791 |
| The number of arcs between instructions in a PDG node | 145952 | 80190 |

COMPILING METHOD, APPARATUS, AND PROGRAM

Priority for the present application is claimed from Japanese Patent Application number 2002-69221 filed on Mar. 13, 2002.

FIELD OF THE INVENTION

The present invention relates to compiling apparatus, method, and program and in particular to a compiling apparatus, method, and program that relaxes dependency to allow for speculative execution.

BACKGROUND ART

Type-safe languages such as Java® ensure characteristics that cause neither invalid memory access nor an unusual termination of a program that is not intended by the programmer. Accordingly, a type-safe language does not allow any invalid memory access and as a result does not cause execution that may cause a program crash. These characteristics of type-safe languages have sharply increased in importance in recent years for security reasons as well. To ensure these characteristics, a software-initiated potentially excepting instructions (S-PEI) that ensures that a program would not terminate must precedes a hardware-initiated potentially excepting instructions (H-PEI), such as a memory access instruction with an invalid address or a Translation Lookaside Buffer (TLB) error. That is, dependency occurs between the instructions in that that an exception check instruction must be executed before a memory access can be executed.

Such dependencies as well as data dependencies and control dependencies in general contained in programs may hinder optimization that changes instruction execution sequence. Speculative execution is known that allows instructions to be reordered. Speculative execution is execution of an instruction before it is determined that the program should be executed. In such a case, a memory access instruction with an invalid value can be executed, therefore a system must support execution that inhibits exception occurrences.

Because a large number of exception instructions are contained in a program written in a type-safe program, speculative instructions are applied more often than a program written in a non-type-safe program such as C or Fortran. However, no methods are known for efficiently applying speculative execution relating to exception check instructions in non-type-safe languages while ensuring reduction in program execution time.

In a program in languages that require precise exception semantics, it must be ensured that the order of S-PEI occurrences is not changed after optimization of the program, therefore in general the optimization that changes the execution sequence of S-PEIs is not simple.

Speculative execution (prior-art reference 1: M. D. Smith, M. S. Lam, and M. A. Horowitz, "Boosting Beyond Static Scheduling in a Superscalar Processor" in Proceedings of the 17th Annual International Symposium on Computer Architecture, pp. 344–354, 1990) is known, which is a method for speeding up the execution of a program by executing an instruction before it is determined that actual execution of that program will be successfully accomplished. Two main speculative execution methods are known. One is a control speculation (prior-art reference 2: S. A. Mahlke, W. Y. Chen, R. A. Bringmann, R. E. Hank, W. W. Hwu, B. R. Rau, and M. S. Schlansker, "Sentinel scheduling: A model for compiler-controlled speculative execution," ACM Transactions on Computer Systems, 11 (4), pp. 376–408, 1993). This method relaxes the control dependency between a branch instruction and the subsequent instruction. It allows a compiler to move an instruction that is frequently executed across a branch instruction. The other is data speculation (prior-art reference 3: D. M. Gallagher and W. Y. Chen and S. A. Mahlke and J. C. Gyllenhaal and W. W. Hwu, "Dynamic memory disambiguation using the memory conflict buffer," in Proceedings of International Conference on Architectural Support for Programming Languages and Operating Systems, pp. 183–193, 1994). This method relaxes the data dependency between a memory store instruction and a memory load instruction. A compiler assumes that a memory store instruction and a memory load instruction access different addresses and moves the load instruction and the subsequent instruction across the memory store instruction.

These studies on speculative execution address C and Fortran, which are not a type-safe language. The only study on speculative execution that addresses a type-safe language is "Exploring the interaction between Java®'s implicitly thrown exceptions and instruct" by M. Arnold, M. S. Hsiao, U. Kremer, and B. Ryder (prior-art reference 4). According to this sturdy, speculative execution across an S-PEI is performed by performing the following steps.

1. An S-PEI contained in a program is decomposed into a compare instruction and a branch instruction.
2. Create a super block having one control entry and more than one control exit.
3. A dependency graph is generated of which the nodes correspond to instructions, each of the nodes having two arcs, a data dependency and control dependency.
4. Instructions are moved within the super block across branch instructions by using general percolation. If an H-PEI is moved across a branch instruction, the H-PEI instruction is transformed into an instruction that can be speculatively executed. If an instruction is moved across a branch instruction, control dependencies are removed from the dependency graph.
5. List scheduling is performed in the dependency graph with consideration given to factors such as instruction latency.

According to the method described in prior-art reference 4, an S-PEI is transformed into a compare instruction and a branch instruction which are used for ordinary conditional branching at step 1. Thus, it has the advantage that a conventional framework for super block scheduling can be used for branch instructions at step 2 and the subsequent steps. FIG. 1 shows an example of actual application. In FIG. 1, an exemplary program in a box at the top is written in Java® and programs in the second to fourth boxes are written in an assembly language. A compiler generates an intermediate representation from a source program provided to it. It then follows the above-described steps to generate a code that can be speculatively executed. First, it decomposes the S-PEI into a compare instruction and a branch instruction. In this example, a null check instruction is decomposed into a compare instruction (cmp) and a branch instruction (jmp). Then, it creates a super block and a dependency graph. It moves instructions across the branch instructions within the super block. Here, instructions, N5, N6, and N7 can be moved across the branch instruction N4. Because instruction N6 is an H-PEI, it is transformed into a speculative load instruction that inhibits an exception occurrence. ("Inhibiting an exception occurrence" means that exception occurrences are not communicated to a predetermined piece of hardware. Instead of communicating the occurrence of an exception, it is recorded in software.) In addition, the control dependencies of N4 on N5, N6, and N7 are removed. Because N8 is used as a sentinel instruction for checking an exception state of speculative execution, N8 cannot be moved across the branch instruction. In this example, if N8 is executed with the occurrence of an exception being inhibited in N6', the instruction sequence is re-executed from N6'. Finally, list scheduling is performed with consideration given to factors such as instruction latency. In the following description with respect to the accompanying drawings, the assumption is that the instruction latency of a load instruction (ld) and a speculative load instruction (ld.s) is 3 and that of the other instructions is 1. The dependency graph shown in the right-hand part of the FIG. 2 corresponds to the intermediate representation of the compiler shown in FIG. 1 before the check instruction is decomposed and the dependency graph shown in the right-hand part of FIG. 2 corresponds to the intermediate representation of the compiler shown in FIG. 1 to which the list scheduling has been applied.

Guarded Program dependency graph (GPDG) (prior-art reference 5: Koseki, Komatsu, and Fukazawa, "Global code scheduling technique and its evaluation," Joint Symposium on Parallel Processing, 1994, pp. 1–8, 1994) is known, which is another method that uses speculative execution by removing arcs. The GPDG is a graph that consists of nodes corresponding to instructions and arcs representing dependencies, data dependencies, and resource dependencies. The graph can represent the execution time of a program and can address control speculation by removing control dependent arcs. However, it does express constraints imposed by exceptions. There is a study for relaxing the order in which exceptions occur (prior-art reference 6: Manish Gupta, Jong-Deok Choi, and Michael Hind, "Optimizing Java® programs in the presence of exceptions," in Proceedings of the 14th European Conference on Object-Oriented Programming (ECOOP'00), pp. 422–446, 2000). Described in this study is optimization by analyzing the liveness of an enclosing exception handler to reorder instruction having a side effect and S-PEI and optimization that decomposes an S-PEI into an instruction checking an exception an instruction for causing an exception and keeps the order of occurrence of the S-PEIs proper to allow for reordering of instructions checking an exception.

In another known technology for relaxing the order in which exceptions occur (prior-art reference 7: U.S. patent application Ser. No. 10/020,656, now U.S. Pat. No. 6,931,635 of Inagaki and Komatsu, entitled "Method for providing mechanism for speculatively executing potentiality excepting institution and speculative exception handling mechanism," an instruction that can generate exceptions due to S-PEIs is separated from an instruction for checking them to shorten a critical path. The dependency between the instruction for checking exception due to S-PEI and an H-PEI still remains. The prior art described in prior-art reference 4 has the following problems.

(a) Separation of an S-PEI into a general-purpose compare instruction and branch instruction can result in increases in the number of branches in a block, the complexity of expressive form of a program, and compiling time. In the example shown in FIG. 1, a branch instruction is generated in the intermediate representation, which is not contained in the original program. This can increase compiling time because it requires the consideration of moving an instruction across a branch instruction during, general percolation.

(b) An H-PEI essentially depends only on an S-PEI. However, because the S-PEI is decomposed into general-purpose branch instructions, the H-PEI comes to depend on all the subsequent instructions when generating a graph having data dependencies and control dependencies. Thus, unnecessary dependencies are produced. In the example shown in FIG. 1, the original null-check instruction guards the subsequent instruction ld r5=[r4] alone. However, because it is transformed into a general branch instruction, control dependencies on all the subsequent instructions are generated, thus producing unnecessary dependencies (see the dependency graph shown in the left-hand part of FIG. 2).

(c) Because precise execution time is not estimated, speculative code motion that does not reducing execution time can result. In the example shown in FIG. 1, because the instruction reordering using general percolation is performed before list scheduling which is performed with consideration given to instruction latency, all the instructions that can be moved are moved. Therefore, it is not ensured that this moving would reduce the execution time.

(d) When S-PEIs are decomposed into general purpose compare instructions and branch instructions, reordering of the S-PEI instructions means reordering of branch instructions, therefore it becomes difficult to optimize the reordering of the S-PEI instruction themselves.

SUMMARY OF THE INVENTION

An aspect of the present invention is to provide compiling apparatus, methods, and programs that overcome these problems. In an example embodiment there is provided a compiling method according to the present invention comprises the following steps: A step of generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI"); A step of extracting a block including a plurality of sequenced instructions in written order of a first intermediate representation program; A step of generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies; A step of determining whether or not an H-PEI node is executed more advantageously with a constraint by an exception dependent arc than without a constraint by the exception dependent arc is more advantageous, based on a criterion for determining advantage in terms of execution time, If it is determined that the H-PEI node is executed more advantageously without a constraint by an exception dependent arc than with a constraint by the exception dependency, the step of generating second dependency graph in which the front edge of the exception dependent arc is moved to another node so that an instruction sequence including the H-PEI node and one or more successive nodes that follow the H-PEI node is speculatively executed; A step of generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled; and A step of generating an object program based on the second intermediate representation program.

An example of a compiling method according to the present invention delivers high performance especially in compilation of programs written in type safe programming languages. The term "type-safe language" as used herein is defined as a programming language that perform predetermined operations only, that is, a programming language that does not allow invalid memory access. Examples of "type" programming languages include Java®, Scheme, CLU, Modula-2, Modula-3, Oberon, and Pascal.

An instruction sequence including an H-PEI and one or more subsequent successive instructions is moved for speculative execution based on a criterion for determining advantage in terms of execution time such as the earliest execution start time of the H-PEI, thereby enabling the H-PEI to be speculatively executed with advantage of the speculative execution being ensured.

An example of a compiling apparatus according to the present invention comprises: means for generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI"); means for extracting a block including a plurality of sequenced instructions in written order of the first intermediate representation program; means for generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies; means for determining which of a case where an H-PEI node is executed with a constraint by an exception dependent arc and a case in which the H-PEI node is executed without a constraint by the exception dependent arc is more advantageous based on a criterion for determining advantage in terms of execution time; means for generating second dependency graph in which the front edge of the exception dependent arc is moved to another node so that an instruction sequence including the H-PEI node and one or more successive nodes that follow the H-PEI node is speculatively executed if it is determined that the case where the H-PET node is executed without a constraint by the exception dependent arc is more advantageous than the case where the H-PEI node is executed with a constraint by the exception dependency; means for generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled; and means for generating an object program based on the second intermediate representation program.

A compiling program according to the present invention causes a computer to perform the following steps.

In embodiments of the invention, it is not necessarily required that the compiling program of the present invention be written in a type-safe language. The compiling program itself may be written in a type-safe language such as Java® or in a non-type-safe language such as C.

BRIEF DESCRIPTION OF THE DRAWINGS:

FIG. 4 shows in the form of program description a procedure for generating an exception dependent arc;

FIG. 5 shows in the form of program description a procedure for generating an exception dependent arc between S-PEIs for determining the order in which exceptions occur;

FIG. 6 is a diagram for illustrating intermediate representations resulting from compilation of a first source program performed by a compiler according to the present invention;

FIG. 8 shows a diagram for illustrating intermediate representations resulting from compilation of a second source program performed by the compiler without a recovery code according to the present invention;

FIG. 14 is a diagram providing a comparison of the performance of a prior-art compiler and the performance of the compiler according to the present invention in benchmark testing.

DESCRIPTION OF SYMBOLS

Figure 1:
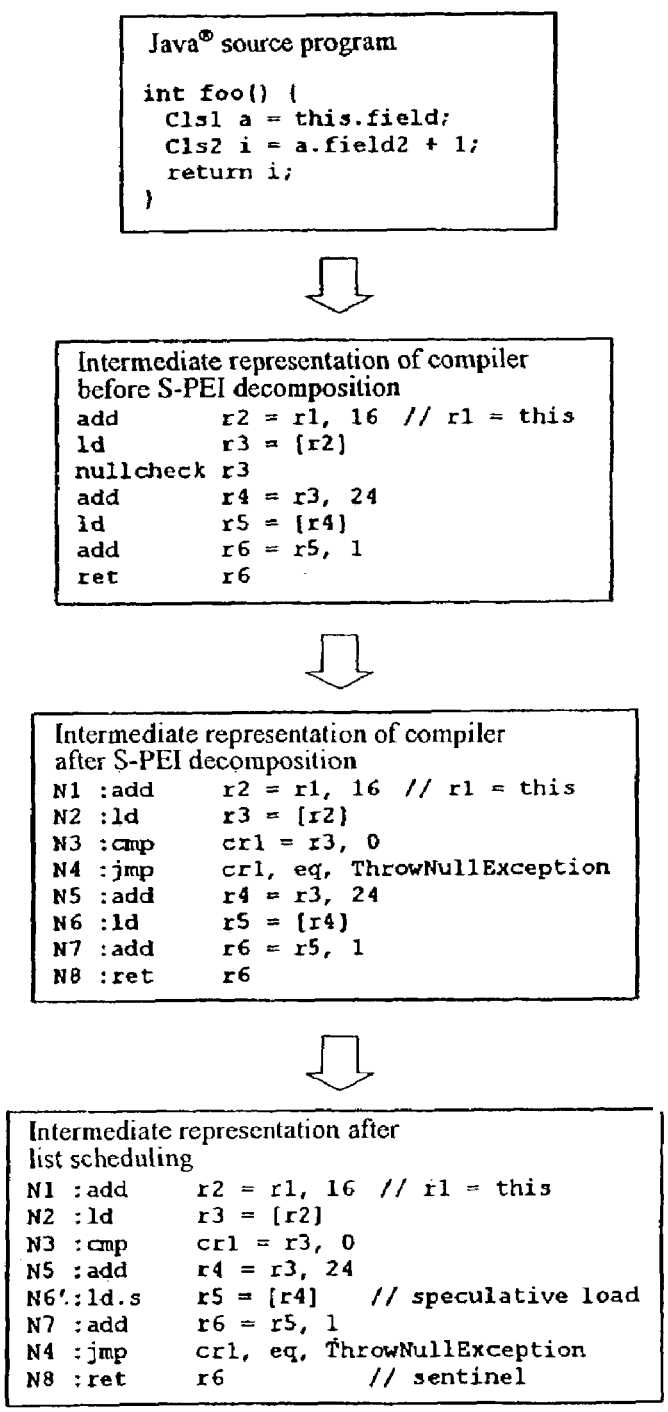
FIG. 1 illustrates an intermediate representation in a compilation process according to the prior art.
Figure 2:
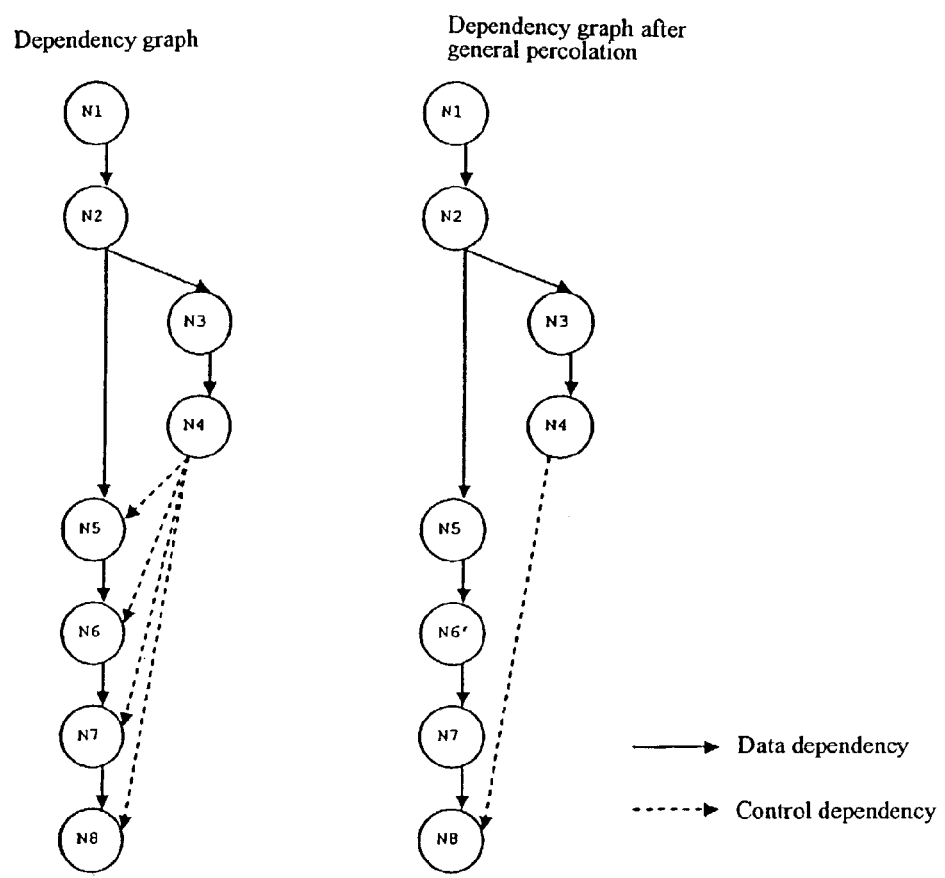
FIG. 2 shows a dependency graph corresponding to the intermediate representation shown in FIG. 1.

20 . . . Compiling apparatus
24 . . . First intermediate representation program generating means
25 . . . Block extracting means
26 . . . First dependency graph information generating means
27 . . . Inter-S-PEI exception dependent arc setting means
30 . . . Advantage determining means
31 . . . Second dependency graph information generating means
34 . . . First recovery setting means
35 . . . Second recovery setting means 36 . . . Inter-S-PEI exception dependent arc changing means 37 . . . Second intermediate representation program generating means 38 . . . Object program generating means

DESCRIPTION THE INVENTION

The present invention provides compiling apparatus, methods, and programs that overcome the problems stated. In an example embodiment there is provided a compiling method according to the present invention comprises the following steps:

A step of generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI"), A step of extracting a block including a plurality of sequenced instructions in written order of a first intermediate representation program, A step of generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies, A step of determining whether or not an H-PEI node is executed more advantageously with a constraint by an exception dependent arc than without a constraint by the exception dependent arc is more advantageous, based on a criterion for determining advantage in terms of execution time, If it is determined that the H-PEI node is executed more advantageously without a constraint by an exception dependent arc than with a constraint by the exception dependency, the step of generating second dependency graph in which the front edge of the exception dependent arc is moved to another node so that an instruction sequence including the H-PEI node and one or more successive nodes that follow the H-PEI node is speculatively executed, A step of generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled, and A step of generating an object program based on the second intermediate representation program.

The criterion for determining advantage in terms of execution time is a criterion determining advantage in terms of time required for executing the entire program or a criterion for determining advantage in terms of the earliest execution start time of an H-PEI. Instruction reordering is determined to be advantageous if the instruction reordering for speculative execution reduces time required for executing the entire program or the earliest execution start time of H-PEI is advanced. The scheduling is not limited to list scheduling. While the scheduling is typically list scheduling, any of various types of scheduling that are known to those skilled in the art may be used. One example of other types of scheduling is scheduling using integer liner programming. Preferably, list scheduling based on the length of the critical path of a program within a block is used. The length of the critical path may be calculated based on the latency of each instruction, for example. Non-exception-dependencies include, besides data dependencies and/or control dependencies, resource dependencies.

The compiling method according to the present invention delivers high performance especially in compilation of programs written in type safe programming languages. The term "type-safe language" as used herein is defined as a programming language that perform predetermined operations only, that is, a programming language that does not allow invalid memory access. Examples of "type" programming languages include Java®, Scheme, CLU, Modula-2, Modula-3, Oberon, and Pascal.

An instruction sequence including an H-PEI and one or more subsequent successive instructions is moved for speculative execution based on a criterion for determining advantage in terms of execution time such as the earliest execution start time of the H-PEI, thereby enabling the H-PEI to be speculatively executed with advantage of the speculative execution being ensured.

An example embodiment of a compiling method according to the present invention may further include the following features.

(a) A first additional step that is performed before scheduling at the latest is added. In the first additional step, a sentinel instruction is set as an instruction corresponding to a node at the front edge of an exception dependent arc that is changed for speculative execution; and an instruction sequence is generated in the intermediate representation program so that an instruction sequence in the first intermediate representation program is re-executed without suppressing the occurrence of the exception if the sentinel instruction is executed with the occurrence of the exception in the H-PEI subjected to speculative execution being suppressed.

(b) A second additional step that is performed before the scheduling at the latest is added. In the second additional step, a check instruction is set as an instruction corresponding to a node at the front edge of an exception dependent arc that is moved for speculative execution; and a copy of the instruction sequence subjected to the speculative execution is placed as a recovery code after the check instruction. In the check instruction it is determined whether occurrence of an exception in the H-PEI subjected to the speculative execution is suppressed and, if the determination is true, an instruction sequence is generated in the first intermediate representation program portion so that the recovery code is executed.

(c) The first dependency graph information includes information about setting of an exception dependent arc (hereinafter referred to as an "inter-S-PEI exception dependent arc") from an S-PEI to the next S-PEI that follow the S-PEI in order. Third and fourth steps that are performed before the scheduling at the latest are added. In the third additional step, an inter-S-PEI exception dependent arc is removed if exceptions relating to nodes at the both ends of the inter-S-PEI exception dependent arc are of the same type, or the inter-S-PEI exception dependent arc is retained if the exceptions at the both ends of the inter-S-PEI exception dependent arc are of the different types. In the fourth additional step, a change made to the inter-S-PEI exception dependent arc at the third additional step is included in the second dependency graph information.

Figure 12:
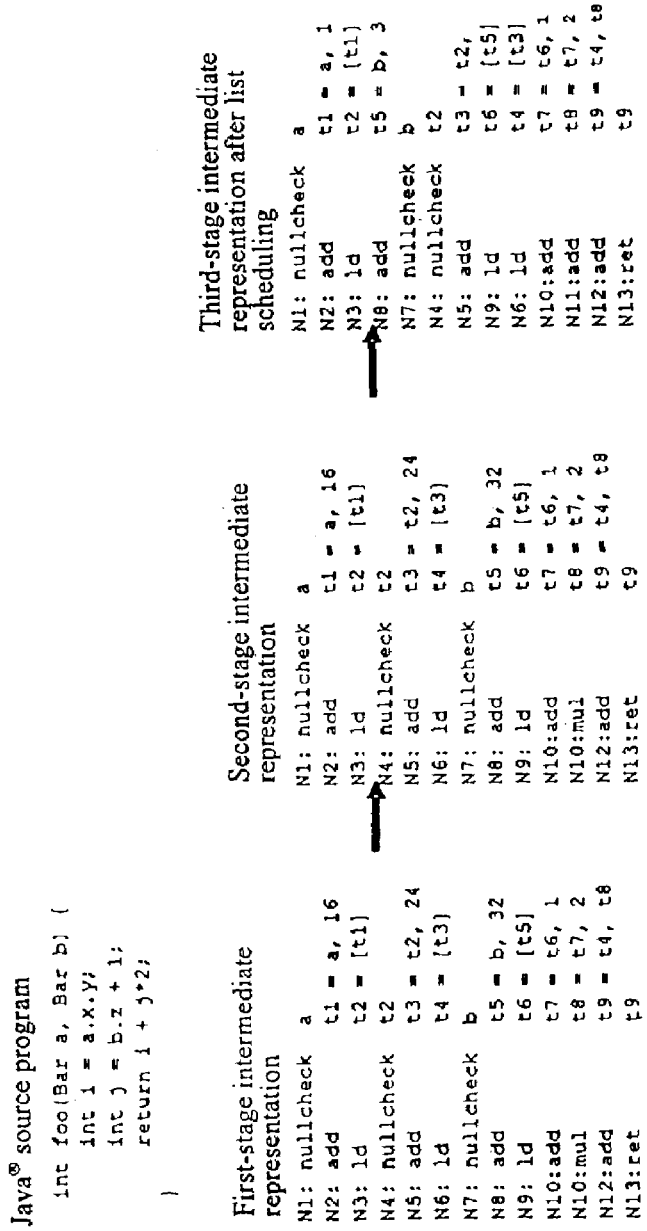
FIG. 12 is a diagram for illustrating intermediate representations resulting from compilation of a third source program performed by the compiler according to the present invention.

The term "exceptions" in "exceptions of the same type" and "exceptions of the different types" means exceptions generated by exceptional instructions (nullcheck on N1, N4, and N7 in FIG. 12, for example). Types of exceptions involving S-PEIs include an input value check and array index check. If S-PEIs corresponding to the nodes on the both sides of an inter-S-PEI exception dependent arc are of the same type, it is determined that exceptions generated by them are of the same type, as a matter of course. In addition, if S-PEIs corresponding to the nodes on the both sides of an inter-S-PEI exception dependent arc are of different types and both of them relates to input checks, exceptions they generate are determined to be of the same type.

An example embodiment of a compiling apparatus according to the present invention comprises:

Means for generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI"), Means for extracting a block including a plurality of sequenced instructions in written order of the first intermediate representation program, Means for generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies, Means for determining which of a case where an H-PEI node is executed with a constraint by an exception dependent arc and a case in which the H-PEI node is executed without a constraint by the exception dependent arc is more advantageous based on a criterion for determining advantage in terms of execution time, Means for generating second dependency graph in which the front edge of the exception dependent arc is moved to another node so that an instruction sequence including the H-PEI node and one or more successive nodes that follow the H-PEI node is speculatively executed if it is determined that the case where the H-PEI node is executed without a constraint by the exception dependent arc is more advantageous than the case where the H-PEI node is executed with a constraint by the exception dependency, Means for generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled; and Means for generating an object program based on the second intermediate representation program.

A compiling program according to the present invention causes a computer to perform the following steps.

In general, it is advantageous that:

The step of generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI"), The step of extracting a block including a plurality of sequenced instructions in written order of the first intermediate representation program, The step of generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies, The step of determining whether or not an H-PEI node is executed more advantageously with a constraint by an exception dependent arc than without a constraint by the exception dependent arc is more advantageous, based on a criterion for determining advantage in terms of execution time, If it is determined that the H-PEI node is executed more advantageously without a constraint by an exception dependent arc than with a constraint by the exception dependency, the step of generating second dependency graph in which the front edge of the exception dependent arc is moved to another node so that an instruction sequence including the H-PEI node and one or more successive nodes that follow the H-PEI node is speculatively executed, The step of generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled, and The step of generating an object program based on the second intermediate representation program.

It is noted that it is not necessarily required that the compiling program of the present invention be written in a type-safe language. The compiling program itself may be written in a type-safe language such as Java® or in a non-type-safe language such as C.

Figure 3:
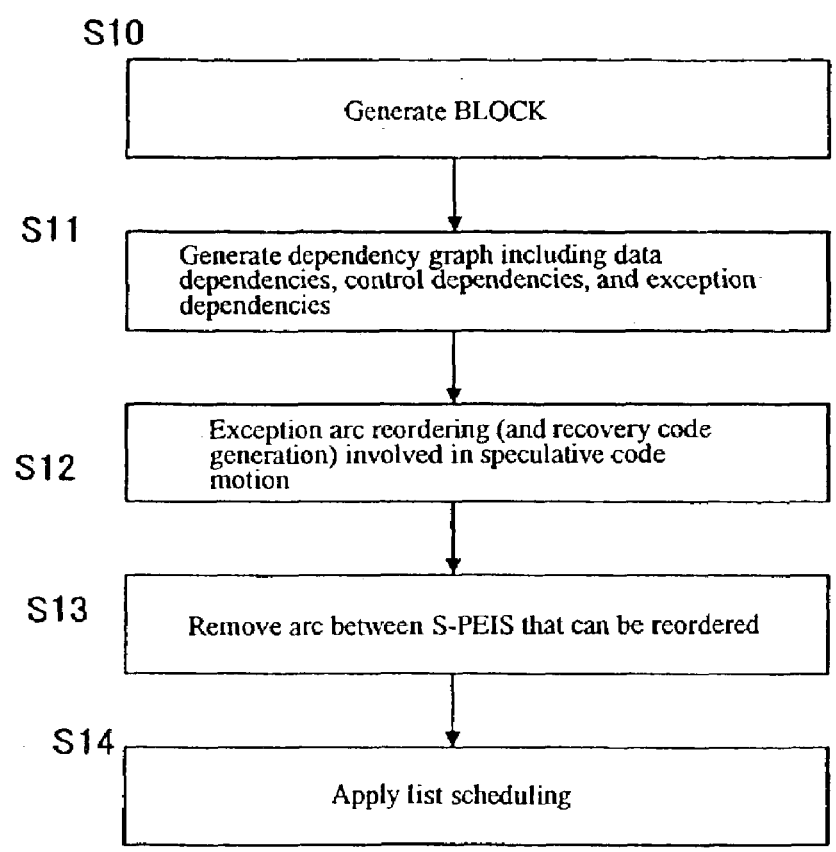
FIG. 3 shows a flowchart of a process for performing speculative execution across an S-PEI.

Embodiments of the present invention will be described with reference to the accompanying drawings. FIG. 3 shows a flowchart of a process for performing speculative execution across an S-PEI. At step S10, a block is formed that has one control entry and one or more exits. Blocks can be classified as a basic block, super block, and hyper block. Each of these blocks has one entry. A basic block has one exit and super and hyper blocks have one or more blocks.

The hyper block has a confluence within it. A confluence is an instruction in which control from a "then" section and an "else" section commonly flows, such as an instruction that follows an "if . . . then . . . else" instruction. More than one exit is formed because of the presence of an instruction such as a branch instruction in a middle part of a block.

Conceptually, a super block subsumes a basic block. The block generated at step S10 may be any of a basic block, super block, and hyper block. At step 11, a dependency graph is generated that has nodes corresponding to instructions and three arcs representing a data dependency, control dependency, and exception dependency. The exception dependency is generated between an S-PEI and an H-PEI. If a language that requires precise exception semantics is used, an exception dependency is also generated between S-PEIs in order to ensure the order in which exceptions occur. At step 12, a comparison is made between the earliest start times, which are determined by a data dependency, control dependency, and exception dependency, for each of H-PEI nodes having an exception dependency from an S-PEI. If and only if the earliest start time determined by the exception dependency is later than the other earliest start times, speculative code motion is applied to move the exception dependent arc to a sentinel instruction. The present invention can be applied as a method for recovering from an exception condition in speculative execution with or without a recovery code. If a recovery code is used, the recovery code is also generated at this step. If exceptions that may occur in S-PEI nodes at the ends of an arc that have an exception dependency from an S-PEI are of the same type, that arc is removed at step S13. At step S14, list scheduling is performed on the dependency graph with consideration given to factors such as instruction latency.

FIG. 4 shows in the form of program description a procedure for generating an exception dependent arc. In FIG. 4, src represents a source and dst represents a destination. Foreach indicates that an operation enclosed within braces { } is performed for each element included in a set in brackets ( ). An instruction that precedes each H-PEI instruction in a block and has its source operand as a destination operand is searched for and, if the instruction having the source operand reached from the destination operand is an S-PEI instruction, an arc is provided between the S-PEI instruction and the H-PEI instruction. Three lines at the bottom of FIG. 4 have meaning as will be described below. More than one S-PEI can have an exception dependent arc to the H-PEI. Therefore, S-PEIs must be searched for until an instruction that generates a value to be used in the H-PEI (an instruction such as new/newarray/getfield/getstatic that generates a memory address) is reached by following data dependencies. The instruction sequence on the three lines is for following the data dependencies until the instruction that generates an operand use in the H-PEI of interest.

If a language requiring precise exception semantics is used, an exception dependent arc is also generated between S-PEIs in order to determine the order in which exceptions occur. This can be generated by following a procedure which will be described below. FIG. 5 shows in the form of program description a procedure for generating an exception dependent arc between S-PEIs in order to determine the order in which exception occur. The instructions in a block are searched through in the reverse post order (from the preceding to the succeeding instruction) until an S-PEI instruction is encountered. Then, the instruction is used for "is" to search through instructions succeeding "is" for an S-PEI instruction in the reverse post order. The first S-PEI instruction found is used as "ie" and an exception arc is provided between "is" and "ie."

Figure 7:
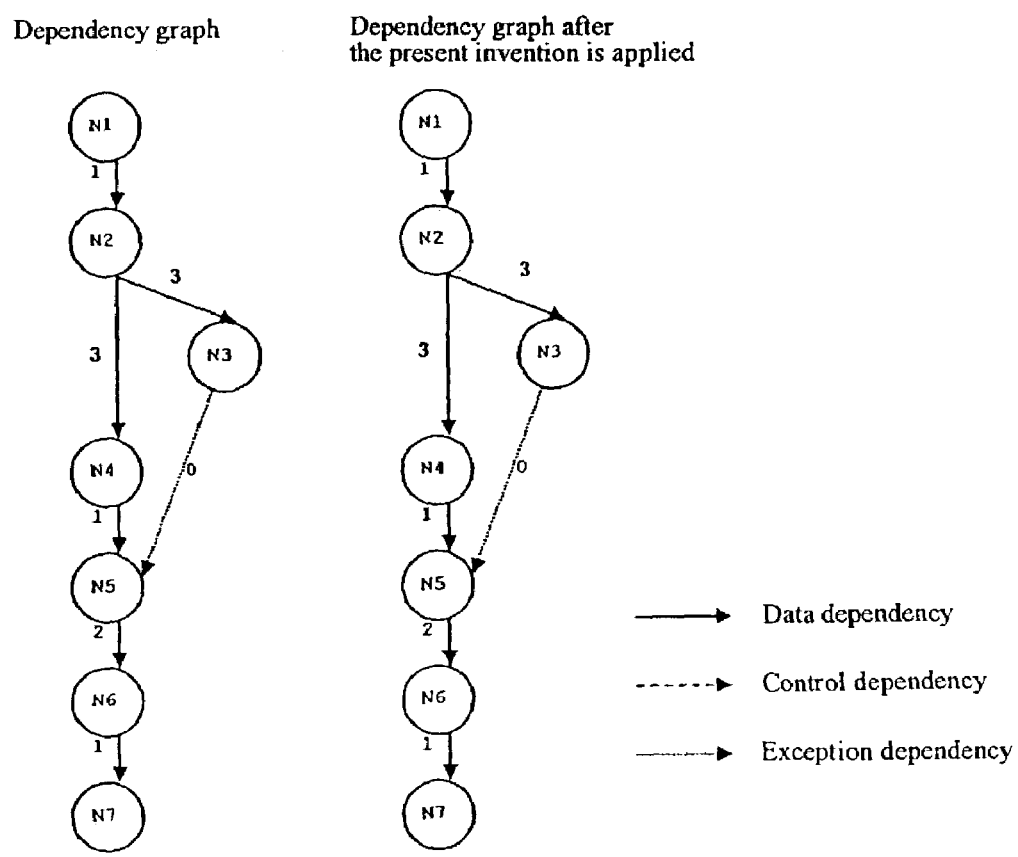
FIG. 7 shows a dependency graph corresponding to the intermediate representations shown in FIG. 6.

FIG. 6 is a diagram illustrating a process performed by a compiler according to the present invention and FIG. 7 is a dependency graph generated by following the process shown in FIG. 6. The Java® program in a box at the top of FIG. 6 is a source program processed by the compiler. The Java® source program is selected as a source program written in a type-safe language for explaining the present invention. The compiler generates an intermediate representation program (for example, a program fragment shown in the second box from the top of FIG. 6 results from the block extraction at step S10 in FIG. 3). In this intermediate representation program, an S-PEI (nullcheck on line N3) for an H-PEI (ld on line N5) is inserted before the H-PEI for ensuring that the program will not unusually terminate. Processes shown in FIGS. 4 and 5 are performed on the intermediate representation program section to generate the dependency graph shown in the left-hand part of FIG. 7. In the dependency graph, the earliest execution start time for the H-PEI node that has an exception dependency from the S-PEI is obtained, which is determined by a data dependency, control dependency, and exception dependency. This can be obtained by accumulating the earliest execution start times determined by the weight of arcs from the start point of the dependency graph to the node in the graph. The weight of an arc for a data dependency or a control dependency is equivalent to the latency of an instruction. The weight of an arc for an exception dependency is 0. In this example, the calculation of time constrained by dependencies for N5 shows that the earliest execution start time determined by the data dependency is 5 (=1+3+1), the earliest execution start time determined by the exception dependency is 4=(1+3+0). Because the earliest execution start time determined by the exception dependency is earlier, the execution start time of this instruction would not be advanced by removing the constraint of the exception dependency. Therefore, speculative code motion is not applied in this case. Unnecessary speculative code motion must be avoided because it may cause performance degradation such as an unnecessary data cache miss and the overhead of instruction re-execution due to a TLB (Translation Lookaside Buffer) miss. The dependency graph in the left-hand part of FIG. 7 is searched for an S-PEI node that can be replaced with the S-PEI, that is, an S-PEI node having an exception dependency from the S-PEI. If the two nodes cause exceptions of the same type and there are no instruction between the two nodes that changes the visible state at the time when one of the exceptions is captured, the exception dependent arc can be removed. An instruction that changes the visible state when an exception is captured is a write to a variable referenced in an exception handler, an array, an instance variable, and a class variable. A write to an array, instance variable, and class variable can be determined more accurately by analyzing the liveness of an enclosing exception handler as described in prior-art reference 6 described earlier. Because there is the only one S-PEI in this example, the S-PEI cannot be replaced. A dependency graph generated in this way is shown in the right-hand part of FIG. 7. Finally, list scheduling is performed based on the dependency graph in the right-hand part of FIG. 7 with consideration given to instruction latency to obtain an intermediate representation shown in the third box from the top of FIG. 6. While N3 and N4 in the intermediate representation in the second box are replaced with each other in the intermediate representation in the third box, they do not need to be replaced with each other because the instruction latency of N3 is 0. List scheduling is performed for the purpose of reducing time required for the entire program to be executed and/or advancing the earliest execution start time of individual instructions.

Figure 9:
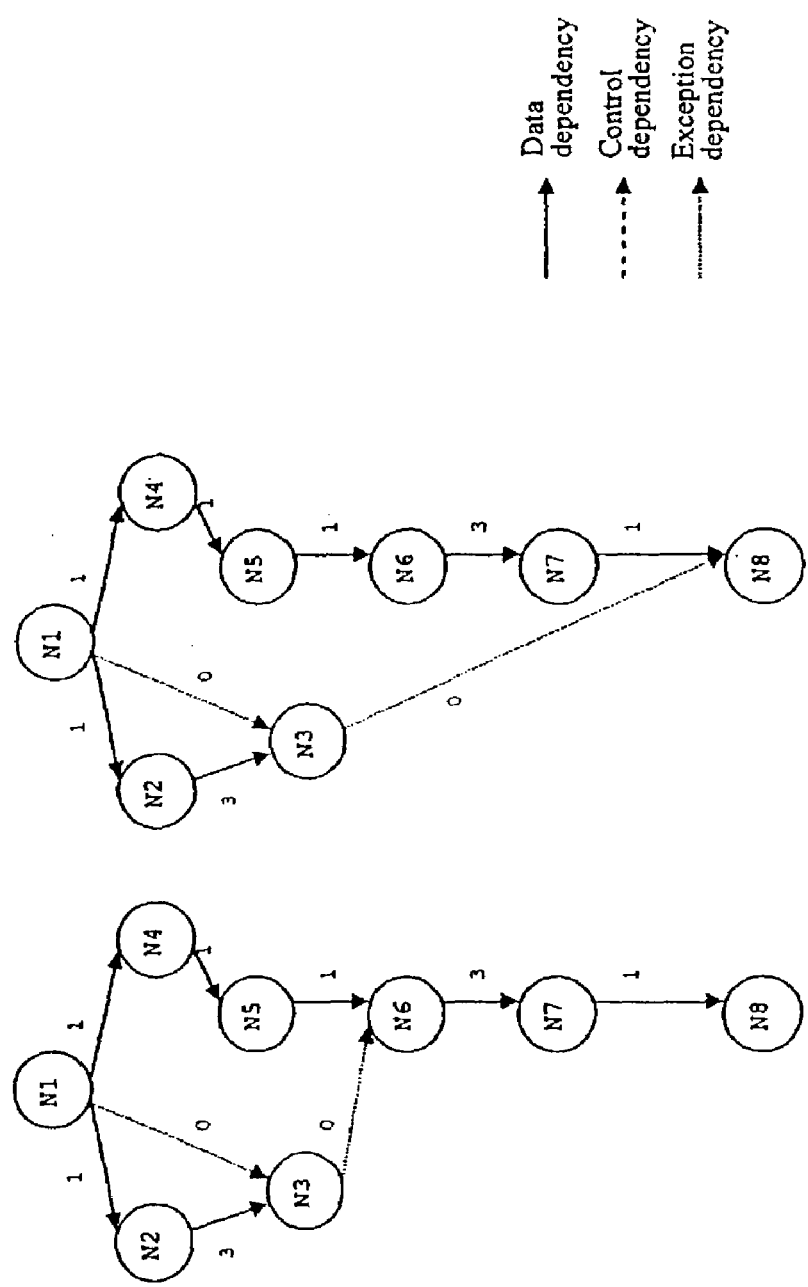
FIG. 9 shows a dependency graph corresponding to the intermediate representations shown in FIG. 8.

An example embodiment of compilation by a compiler according to the present invention will be described below. Related drawings are FIGS. 8 and 9. FIG. 8 illustrates a process performed by the compiler and FIG. 9 shows a dependency graph generated by following the process shown in FIG. 8. This embodiment will be described with respect to a method for recovering from an exception condition in speculative execution in a Java® program without a recovery code will be described. As described earlier, "without a recovery code" means that an existing general-purpose code is used instead of generating program's own recovery code. Therefore generation of program's own recovery code will be omitted. First, a block (a basic block in this example) is formed. The first-stage intermediate representation shown in FIG. 8 represents an instruction list in this block. Then, a dependency graph (the dependency graph shown in the left-hand part of FIG. 9) including data dependencies, control dependencies, and exception dependencies is generated based on the first-stage intermediate representation.

In generating the dependency graph, exception dependencies are generated between S-PEIs and between an S-PEI and an H-PEI. In this example, the exception dependency between the S-PEIs is generated on N1→N3 (the newarray instruction on N1 is an S-PEI instruction that can generate an exception) and the dependency between the S-PEI and an H-PEI is generated on N3→N6. Then, the earliest execution start time for the H-PEI node having the dependency from the S-PEI node is obtained, which is determined by data, control and exception dependencies. In this example, the calculation of time constrained by the dependencies for N6 shows that the earliest execution start time determined by the data dependency is 3 and the earliest execution start time determined by the exception dependency is 4.

Because the earliest execution start time determined by the exception dependency is later, the execution start time of this instruction can be advanced by removing the constraint of the exception dependency. Thus, speculative code motion is applied to this case. In this example, N6 and N7 are subjected to the speculative code motion and N8 is used as a sentinel instruction. Because N6, which is the H-PEI instruction, is speculatively moved, the load instruction (ld) on N6 is transformed to a speculative load instruction (ld.s). Then, the exception dependent arc from N3 to N6 is removed and an exception dependent arc is provided from N3 to N8, which is the sentinel instruction (see the dependency graph in the right-hand part of FIG. 9). In this example, there is an inter-S-PEI arc on N1→N3. This arc, however, cannot be removed because the exception generated by N1 differs from the exception generated by N3. In this way, the second-stage intermediate representation shown in FIG. 8 is generated that corresponds to the dependency graph in the right-hand part of FIG. 9.

Finally, the second-stage intermediate representation is rescheduled with consideration given to instruction latency to produce the third-stage intermediate representation shown in FIG. 8. In this example, if N8 has been executed with the occurrence of an exception being suppressed in N6, the instruction sequence is re-executed without suppressing the occurrence of an exception in N6. In this way, in a case where no recovery code is used, recovery capability is provided to a given instruction (N8: ret in FIG. 8, for example) as appropriate as recovery measures, instead of providing a code dedicated to recovery as in N10–N12 in the second-stage intermediate representation in FIG. 10, which will be described later. While the length of the critical path (the length of the longest path reaching the last instruction in a block, where a path length is calculated based on instruction latency) is 8=(1+3+0+3+1) in the dependency graph shown in the light-hand part of FIG. 8, it is reduced to 7=(1+1+1+3+1) in the dependency graph shown in the right-hand part of FIG. 8.

Figure 10:
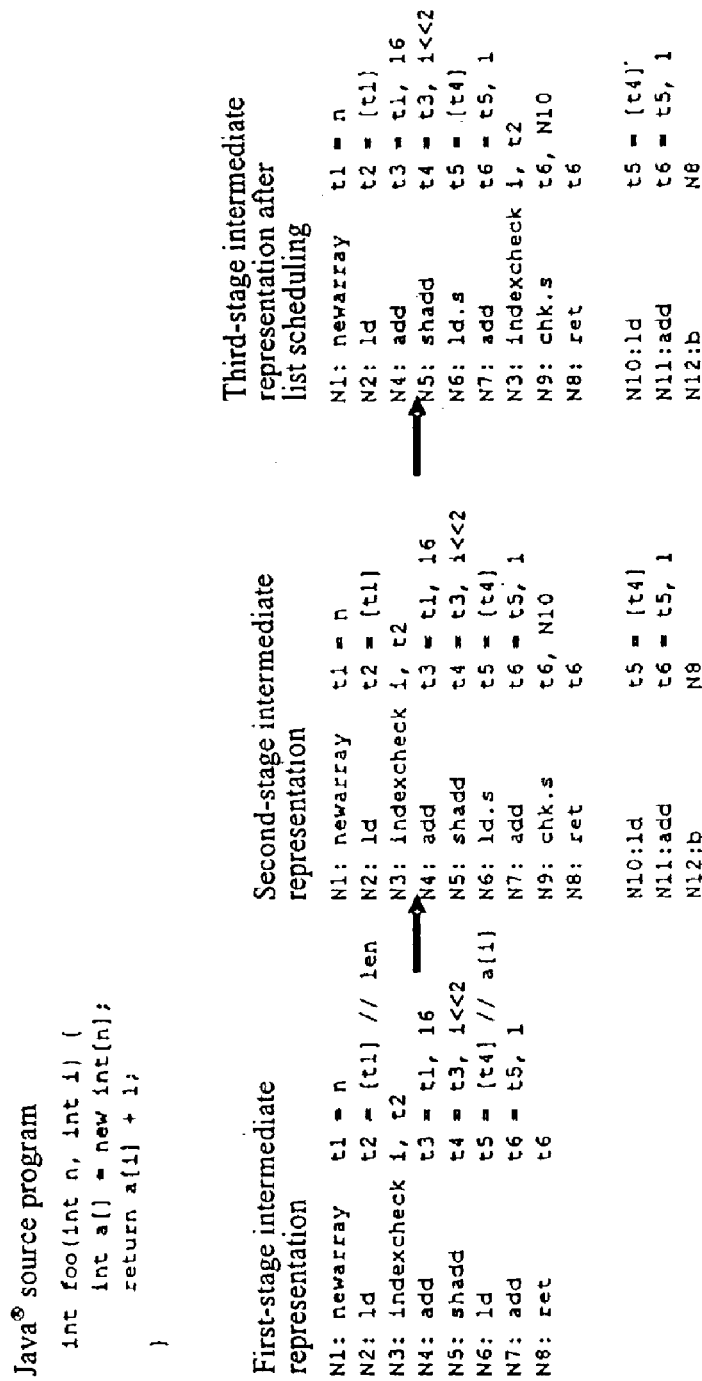
FIG. 10 is a diagram illustrating intermediate representations resulting from compilation of the second program performed by the compiler with a recovery code according to the present invention.
Figure 11:
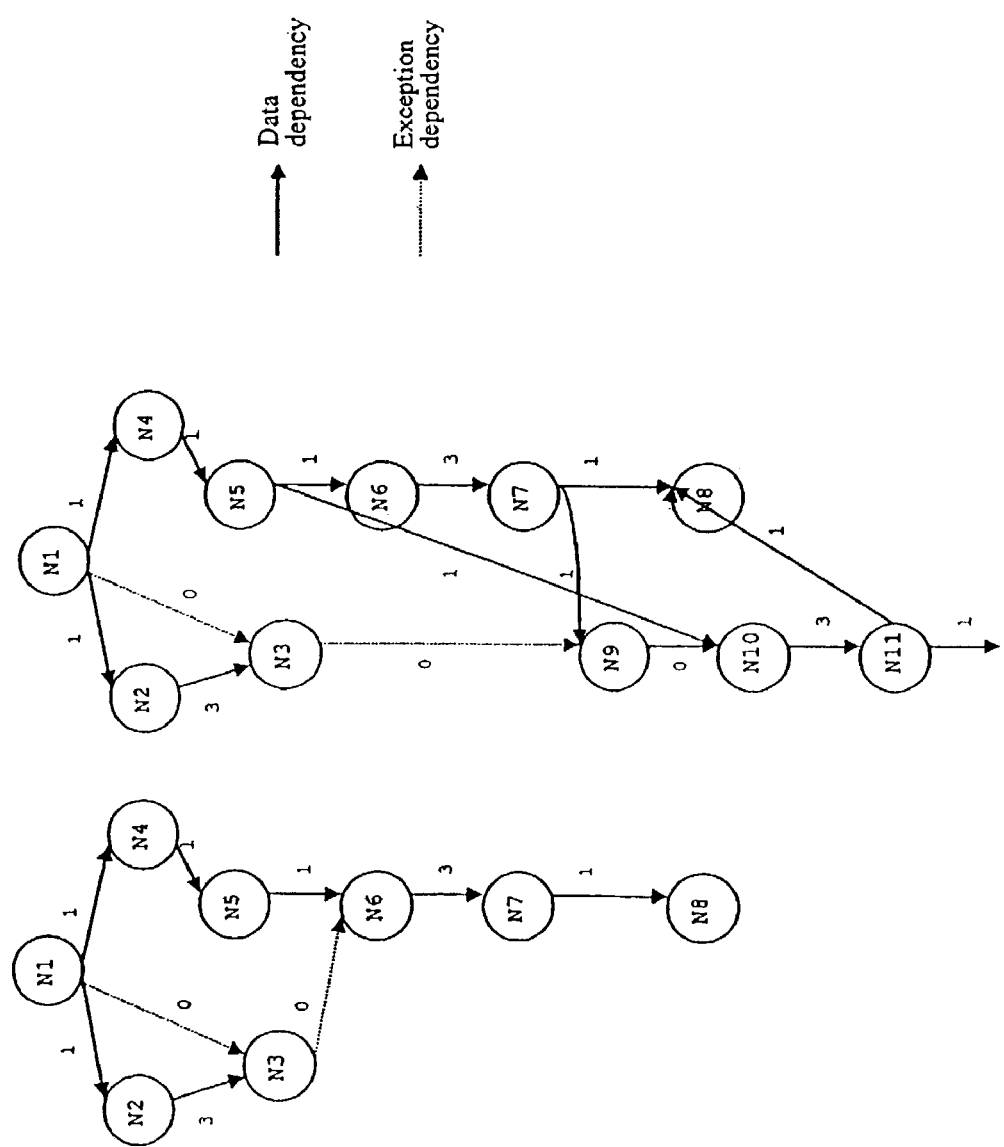
FIG. 11 shows a dependency graph corresponding to the intermediate representations shown in FIG. 10.

An example compilation of a Java® program will be described below. Related drawings are FIGS. 10 and 11. First, a block (basic block, in this example) is formed to provide the first-stage intermediate representation shown in FIG. 10. Then, a dependency graph (the dependency graph shown in the left-hand part of FIG. 11) including data, control and exception dependencies is generated based on this first-stage intermediate representation. In generating this dependency graph, exception dependencies are generated between S-PEIs and between an S-PEI and an H-PEI. In this example, the exception dependency between the S-PEIs are generated on N1→N3 and the dependency between the S-PEI and H-PEI is generated on N3→N6. Then, the earliest execution start time is obtained for the H-PEI node H-PEI having the exception dependency from the S-PEI node is obtained, which is determined by data, control and exception dependencies. In this example, the calculation of time constrained by the dependencies for N6 shows that the earliest execution start time determined by the data dependency is 3 and the earliest execution start time determined by the exception dependency is 4. Because the earliest execution start time determined by the exception dependency is later, the execution start time of this instruction can be advanced by removing the constraint of the exception dependency. Thus, speculative code motion is applied to this case. In this example, N6 and N7 are subjected to the speculative code motion. Because N6, which is the H-PEI instruction, is speculatively moved, the load instruction (ld) on N6 is transformed to a speculative load instruction (ld.s). A chk instruction (chk.s) is added as N9 for checking the speculative load instruction to see if an exception is suppressed and to determine whether or not a recovery code should be executed. Then, N6 and N7, which are to be speculatively moved are copied and added as N10 and N11 for the recovery code. Here, the speculative load instruction is transformed to a normal load instruction. Finally, a branch instruction (b) is added as N12 for returning from the recovery code. The exception dependent arc from N3 to N6 is removed and an exception dependency is provided from N3 to N9. Because t6 is read in N9 in order to determine whether or not an exception is suppressed, an data dependent arc is provided from N7 to N9. Because N10 in the recovery code reads t4, a data dependent arc is provided from N5 to N10. Because t6 defined in N11 is read in N8, a data dependent arc is provided from N11 to N8. Given that the latency of the chk instruction is 0, then the weight of the arc will be 0. There is an inter-S-PEI arc on N1→N3 in this example. However, this arc cannot be removed because the exception generated by N1 differs from the exception generated by N3. In this way, the second-stage expression in FIG. 10 is completed that corresponds to the dependency graph shown in the right-hand part of FIG. 11. Finally, list scheduling is performed with consideration given to instruction latency to produce the third-state intermediate representation in FIG. 10. Because the recovery code consisting of N10, N11, and N12 would be executed on rare occasions, the list scheduling is applied to the recovery code separately from the code consisting of N1–N9, which will be frequently executed. During list scheduling of the frequently executed code, arcs from the recovery code is ignored. The critical path length, which was 8=(1+3+0+3+1) before the present invention was applied, is reduced to 7=(1+1+1+3+1).

Figure 13:
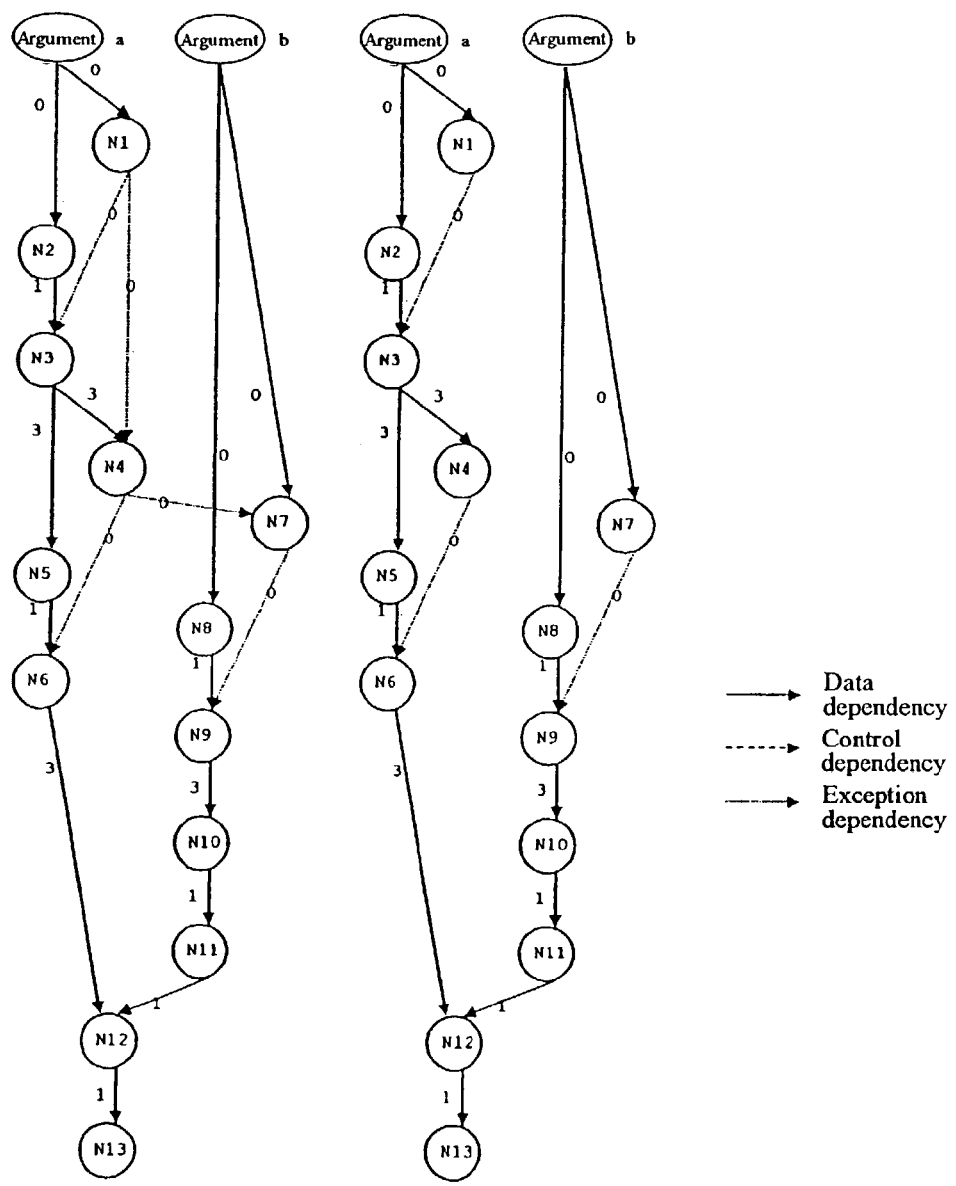
FIG. 13 shows a dependency graph corresponding to the intermediate representations shown in FIG. 12.

An example will be provided below in which S-PEIs can be reordered in the compilation of a Java® program. Related drawings are FIGS. 12 and 13. A compiler compiles a Java® program shown in FIG. 12. First, a block (basic block, in this example) is formed to provide the first-stage intermediate representation shown in FIG. 12. Then, a dependency graph (shown in the left-hand part of FIG. 13) is formed that consists of data, control, and exception dependencies. In generating the dependency graph, exception dependencies are generated between S-PEIs and between an S-PEI and an H-PEI. In this example, the exception dependencies between S-PEIs are provided on N1→N4→N7 and dependencies between an S-PEI and H-PEI are provided on N1→N3, N4→N6, and N7→N9. Then, the earliest execution start time is obtained for the H-PEI nodes having an exception dependency from an S-PEI, which is determined by data, control, and exception dependencies. In this example, the earliest execution start time of any of N3, N6, and N9 that is determined by the data dependency is later than the earliest execution start time determined by the exception dependency. Therefore, speculative code motion is not applied to this example. Because there are inter-S-PEI dependencies on N1→N4→N7, exceptions generated by N1, N4, and N7 are the same NullPointerException, and no instructions change the visible state among these three nodes at the time when the exceptions are captured, the exception dependent arcs are removed. The right-hand part of FIG. 13 shows a dependency graph changed through the process described above. The program that corresponds to the dependency graph is the second-stage intermediate representation shown in FIG. 12. Finally, list scheduling is performed based on the second intermediate representation with consideration given to instruction latency to provide the third-stage intermediate representation. While the critical path length is 10=(0+1+3+0+0+3+1+1+1) {argument a →N2→N3→N4→N7→N9→N10→N11→N12→N13} in the first-stage intermediate representation, the critical path length in the third-stage intermediate representation after the scheduling is reduced to 9=(0+1+3+1+3+1) {argument a →N2→N3→N5→N6→N12→N13}.

A given Java® source program was compiled by the compiler according to the present invention and by a compiler according to the prior art, with a recovery code being used as measures for recovering from exceptions. The performance of the compiler according to the present invention provided a performance improvement of approximately 8% in compress, mpegaudio, and db of the SPECjvm 98 benchmark. 1,070 methods are performed during the execution of SPECjvm98 benchmark.

FIG. 14 shows the number of nodes and arcs in a DAG. In the prior-art, a PDG was divided at an S-PEI instruction and arcs to the subsequent PDG and an exception handler were provided. It can be seen that the compiler of the present invention provide a small total number of PDG nodes and smaller total number of arcs compared with the prior-art compiler. Accordingly, the amount of memory required for compilation by the compiler according to the present invention is smaller. Furthermore, the number of instructions contained in one PDG node was four times larger compared with the prior art. Thus, for the prior-art to provide the same effect as that of the present invention, global code motions must be used, such as trace scheduling and percolation scheduling, that take longer time. Also in this respect, the present invention can improve the efficiency of compilation.

Figure 15:
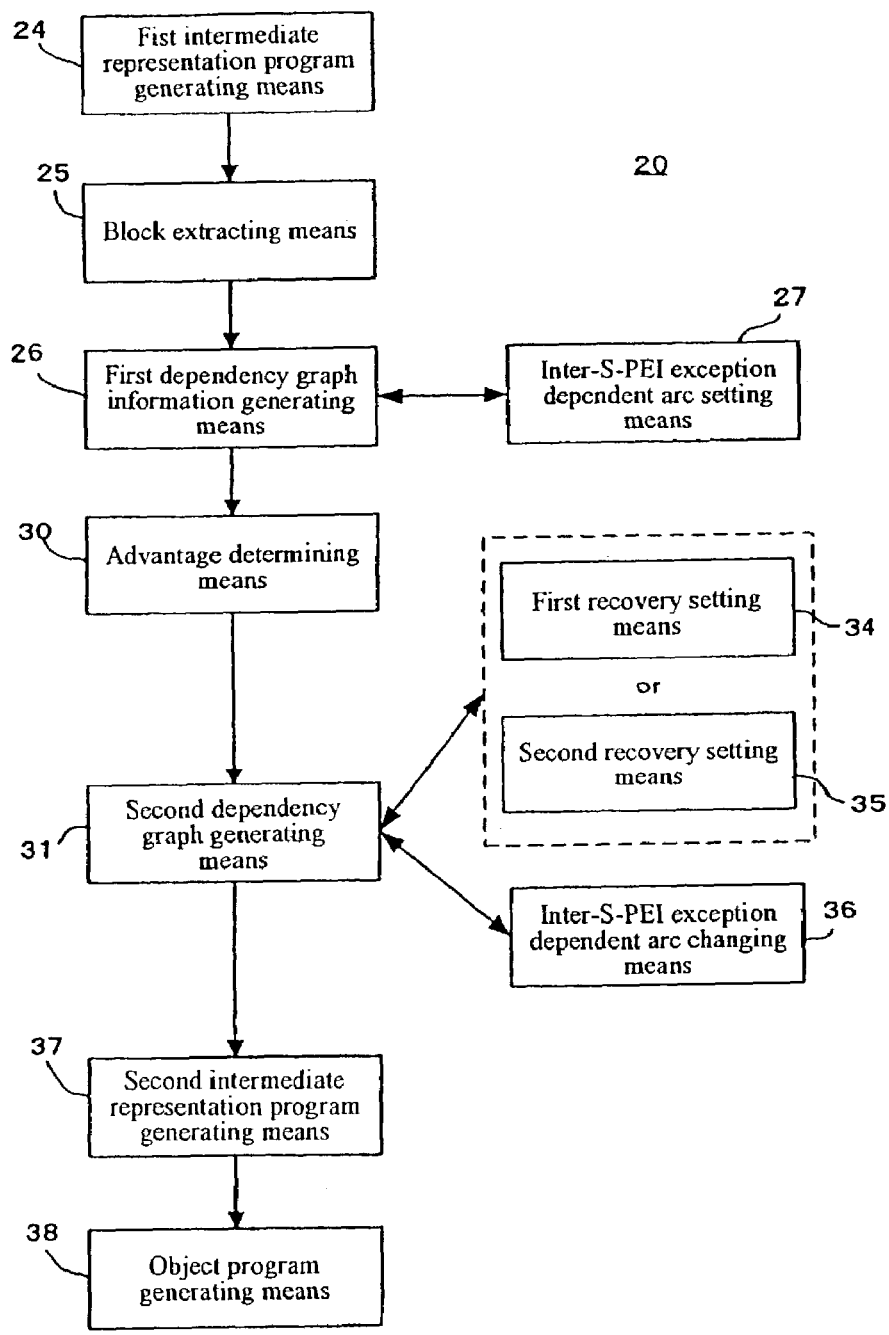
FIG. 15 shows a functional block diagram of a compiling apparatus.

FIG. 15 is a functional block diagram of a compiling apparatus 20. First intermediate program generation means 24 generates a first intermediate representation program form a source program written in a type-safe language such as Java®. In the first intermediate representation program, an S-PEI (for example N3 in the first-stage intermediate representation in FIG. 8) which is an exception check instruction is inserted before an S-PEI (N6 in the first-stage expression in FIG. 8), which is an instruction that can cause the program to unusually terminate for ensuring that the program will not terminate. Block extracting means 25 extracts a block (for example the first-stage expression in FIG. 8) containing a plurality of successive instructions in the order described in a first-stage expression program.

First dependency graph information generating means 26 generates a first dependency graph information (for example information for the dependency graph shown in the left-hand part of FIG. 9) relating to the intermediate representation program portion of the block extracted by the block extracting means 25. In the first dependency graph information, instructions are represented as nodes and an arc is provided between nodes having a dependent relation between them. Exception dependent arcs (arrows in FIG. 9 dotted arrows, for example) concerning exception dependencies are marked as different from non-exception-dependent arcs concerning dependencies other than the exception dependencies. An inter-S-PEI exception dependent arc setting means 27 adds information about the setting of inter-S-PEI-dependent arcs (arrows from N1 to N3 in the dependency graph in the left-hand part of FIG. 9) to the first dependency graph information generated in the first dependency graph information generating means 26. An advantage determining means 30 determines, based on a criterion for determining advantage in terms of execution time, which is more advantageous, to execute an H-PEI node with a constraint by a dependent arc or to execute it without a constraint by the dependent arc in the first dependency graph information generated by the first dependency graph information generating means 26. The criterion for determining advantage in terms of execution may be a criterion for determining advantages in terms of the earliest execution time of an H-PEI. If the earliest execution start time of the H-PEI when executed with a constraint by the exception dependent arc is earlier than when executed without a constraint by the exception dependent arc, then it is determines that instruction reordering for speculative instruction execution should be performed.

If it is determined that execution of an H-PEI with a constraint by an exception dependency is more advantageous than execution without a constraint by the exception dependent arc, second dependency graph information generating means 31 moves the front edge of the exception dependent arc to another node so that the instruction corresponding too the H-PEI node and the instruction sequence corresponding to several nodes that follow that S-PEI are speculatively executed and generates a second dependency graph information (information for the dependency graph in the right-hand part of FIG. 9, for example) corresponding to this change. Only one of first recovery setting means 34 and second recovery setting means 35 is involved in each block in the intermediate representation program. That is, the compiling apparatus 20 may have one of the first and second recovery setting means 34 and 35, or may have both of them so as to involve the first recovery setting means 34 in some blocks and involve the second recovery setting means 35 on other blocks. The first recovery setting means 34 performs a process without a recovery code on a block in the intermediate representation program portion and the second recovery setting means 35 performs a process with a recovery code on a block in the intermediate representation program portion. The first recovery setting means 34 sets as a sentinel instruction the instruction that corresponds to a node (N8 in the dependency graph in the right-hand part of FIG. 9, for example) at the front edge of an exception dependent arc that is moved to the node for speculative execution as a result of the determination by the advantage determining means 30 and edits the instruction sequence within the first intermediate representation program portion (the second-stage intermediate representation in FIG. 8, for example) so that an H-PEI (N6 in the dependent graph in the right-hand part of FIG. 9, for example) re-executes instructions to have been speculatively executed (N6 and N7 in the dependency graph in the right-hand part of FIG. 9, for example) without suppressing occurrence of exceptions if the sentinel instruction is executed with the occurrence of the exceptions being suppressed. While N8 in the second-stage intermediate representation in FIG. 8 is represented as ret (return) like N8 in the first-stage intermediate representation in FIG. 8, the ret in N8 in the second-stage expression has the function as the sentinel instruction added to it. The second recovery setting means 35 sets as a check instruction the instruction corresponding to a node (N9 in the dependency graph in the right-hand part of FIG. 11) at the front edge of an exception dependent arc that is moved for speculative execution as a result of the determination by the advantage determining means 30 and places as a recovery code a copy of an instruction sequence (N10 and N11 in the dependency graph in the right-hand section of FIG. 11, for example) to be speculatively executed at the position after the check instruction. In the copy, an instruction that has been changed to the speculative instruction (ld.s in N6 in FIG. 10, for example) is restored to the original, normal instruction (ld, for example). The block extracting means 25 edits the instruction sequence in the first intermediate representation program portion (the second-stage intermediate representation in FIG. 10). In this editing, it is determined in the check instruction (N9 in the dependency graph in the right-hand part of FIG. 11, for example) whether or not exceptions are suppressed in the S-PEI (for example N6) subjected to the speculative execution are suppressed. If the determination is true, then the recovery code (N10 and N11, for example) is executed. If exceptions concerning nodes at both ends of an inter-S-PEI exception dependent arc are of the same type, inter-S-PET exception dependent arc changing means 36 removes the inter-S-PEI exception dependent arc (note N4→N7 in the dependency graphs shown in FIG. 13). If the exception concerning the nodes at both ends of the inter-S-PEI exception dependent arc are of different types, then the inter-S-PEI exception dependency changing means 36 changes the second dependency graph information (the dependency graph in the right-hand part of FIG. 13, for example) so as to retain the inter-S-PEI exception dependent arc (note N2→N4 in the dependency graphs in FIG. 13). Second intermediate representation program means 37 generates an entire second intermediate representation program composed of second intermediate representation portions (the compiler intermediate representations after list scheduling shown in FIGS. 8, 10, and 13), which are intermediate representation program portions resulting from list scheduling of the first intermediate representation program portions. The list scheduling may be performed in view of minimizing the length of the critical path of the program in the block, for example. Object program generating means 38 generates an object program based on the second intermediate representation program generated by the second intermediate representation program means 37.

In summary, the following matters relating to configurations of a compiling apparatus and program are disclosed.

(1) A compiling apparatus comprising:

means for generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI");

means for extracting a block including a plurality of sequenced instructions in written order of the first intermediate representation program;

means for generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;

means for determining whether or not an H-PEI node is executed more advantageously with a constraint by an exception dependent arc than without a constraint by the exception dependent arc is more advantageous, based on a criterion for determining advantage in terms of execution time;

means for generating second dependency graph in which the front edge of the exception dependent arc is moved to another node so that an instruction sequence including the H-PEI node and one or more successive nodes that follow the H-PEI node is speculatively executed if it is determined that the H-PEI node is executed more advantageously without a constraint by the exception dependent arc than with a constraint by the exception dependency;

means for generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled; and means for generating an object program based on the second intermediate representation program.

In some embodiments of the compiling apparatus according to (1) wherein the criterion for determining advantage in terms of execution time is a criterion for determining advantage in terms of the earliest execution time of the H-PEI.

(3) The compiling apparatus according to (1) or (2), wherein the scheduling is list scheduling for minimizing the length of a critical path of the program in the block.

(4) The compiling apparatus according to any of (1) to (3), wherein the non-exception-dependencies include data dependencies and/or control dependencies.

(5) The compiling apparatus according to any of (1) to (4), further comprising:

means for setting as a sentinel instruction an instruction corresponding to a node at the front edge of an exception dependent arc that is changed for speculative execution and generating an instruction sequence in the intermediate representation program so that an instruction sequence in the first intermediate representation program is re-executed without suppressing the occurrence of the exception if the sentinel instruction is executed with the occurrence of the exception in the H-PEI subjected to speculative execution being suppressed.

(6) The compiling method according to any of (1) to (4), comprising: means for setting as a check instruction an instruction corresponding to a node at the front edge of an exception dependent arc that is moved for speculative execution and placing as a recovery code a copy of the instruction sequence subjected to the speculative execution in a position after the check instruction; wherein the check instruction determines whether occurrence of an exception in the H-PEI subjected to the speculative execution is suppressed and if the determination is positive, generates an instruction sequence in the first intermediate representation program portion so that the recovery code is executed.

(7) The compiling apparatus according to any of (1) to (7), comprising:

means for including information about setting of an exception dependent arc (hereinafter referred to as an "inter-S-PEI exception dependent arc") from an S-PEI to the next S-PEI that follow the S-PEI in order into the first dependency graph information; and means for changing the second dependency graph information so that an inter-S-PEI exception dependent arc is removed if exceptions relating to nodes at the both ends of the inter-S-PEI exception dependent arc are of the same type, or the inter-S-PEI exception dependent arc is retained if the exceptions at the both ends of the inter-S-PEI exception dependent arc are of the different types.

(8) A compiling program for causing a computer to execute the steps of: generating a first intermediate representation program from a source program, the first intermediate representation program being inserted with an exception check instruction (hereinafter referred to as an "S-PEI") prior to an instruction by which a program is unusually terminated (hereinafter referred to as an "H-PEI");

extracting a block including a plurality of sequenced instructions in written order of the first intermediate representation program; generating first dependency graph information for the block, the first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;

determining whether or not an H-PEI node is executed more advantageously with a constraint by an exception dependent arc than without a constraint by the exception dependent arc is more advantageous, based on a criterion for determining advantage in terms of execution time;

if it is determined that the H-PEI node is executed more advantageously without a constraint by an exception dependent arc than with a constraint by the exception dependency, generating second dependency graph in which the front edge of the exception dependent arc is moved to another node so that an instruction sequence including the H-PEI node and one or more successive nodes that follow the H-PEI node is speculatively executed;

generating a second intermediate representation program including an intermediate program portion (hereinafter referred to as a "second intermediate representation portion") resulting from scheduling of an intermediate representation program portion (hereinafter referred to as a "first intermediate representation portion") corresponding to the second dependency graph information is scheduled; and generating an object program based on the second intermediate representation program.

(9) The compiling program according to (8), wherein the criterion for determining advantage in terms of execution time is a criterion for determining advantage in terms of the earliest execution time of the H-PEI.

(10) The compiling program according to (8) or (9), wherein the scheduling is list scheduling for minimizing the length of a critical path of the program in the block.

(11) The compiling program according to any of (8) to (10), wherein the non-exception-dependencies include data dependencies and/or control dependencies.

(12) The compiling program according to any of (8) to (11), causing the computer to perform the a first additional step before the scheduling at the latest, the first additional step setting as a sentinel instruction an instruction corresponding to a node at the front edge of an exception dependent arc that is changed for speculative execution; and generating an instruction sequence in the intermediate representation program so that an instruction sequence in the first intermediate representation program is re-executed without suppressing the occurrence of the exception if the sentinel instruction is executed with the occurrence of the exception in the H-PEI subjected to speculative execution being suppressed.

(13) The compiling program according to any of (8) to (11), causing the computer to perform a second additional step before the scheduling at the latest, the second additional step setting as a check instruction an instruction corresponding to a node at the front edge of an exception dependent arc that is moved for speculative execution;

placing as a recovery code a copy of the instruction sequence subjected to the speculative execution in a position after the check instruction; wherein the check instruction determines whether occurrence of an exception in the H-PEI subjected to the speculative execution is suppressed; and if the determination is true, generates an instruction sequence in the first intermediate representation program portion so that the recovery code is executed.

(14) The compiling program according to any of (8) to (13), wherein the first dependency graph information includes information about setting of an exception dependent arc (hereinafter referred to as an "inter-S-PEI exception dependent arc") from an S-PEI to the next S-PET that follow the S-PEI in order, the program causing the computer to perform third and fourth additional steps before the scheduling at the latest;

the third additional step removing an inter-S-PEI exception dependent arc if exceptions relating to nodes at the both ends of the inter-S-PET exception dependent arc are of the same type, or retaining the inter-S-PEI exception dependent arc if the exceptions at the both ends of the inter-S-PEI exception dependent arc are of the different types; and the fourth additional step including into the second dependency graph information a change to the inter-S-PEI exception dependent arc made at the third additional step.

[Advantages of the Invention]

There are provided the compile apparatus and method that performs proper speculative execution in the presence of exception dependencies, as described above.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A compiling method comprising the steps of:
generating a first intermediate representation program from a source program, said first intermediate representation program being inserted with an exception check instruction (hereinafter referred to as an "S-PEI") prior to an instruction by which a program is unusually terminated (hereinafter referred to as an "H-PEI");
extracting a block including a plurality of sequenced instructions in written order of said first intermediate representation program;
generating first dependency graph information for said block, said first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;
determining whether or not an H-PEI node is executed more advantageously with a constraint by an exception dependent arc than without a constraint by said exception dependency, based on a criterion for determining advantage in terms of execution time;
if it is determined that the H-PEI node is executed more advantageously without a constraint by an exception dependent arc than with a constraint by the exception dependency, generating second dependency graph in which the front edge of the exception dependent arc is moved to another node so that an instruction sequence including said H-PEI node and one or more successive nodes that follow said H-PEI node is speculatively executed;
generating a second intermediate representation program including an intermediate program portion (hereinafter referred to as a "second intermediate representation program portion") resulting from scheduling of an intermediate representation program portion (hereinafter referred to as a "first intermediate representation portion") corresponding to said second dependency graph information is scheduled; and
generating an object program based on said second intermediate representation program.

2. The compiling method according to claim 1, wherein said criterion for determining advantage in terms of execution time includes a criterion for determining advantage in terms of the earliest execution time of the H-PEI.

3. The compiling method according to claim 1, wherein said scheduling includes list scheduling for minimizing the length of a critical path of the program in the block.

4. The compiling method according to claim 1, wherein said non-exception-dependencies include data dependencies and/or control dependencies.

5. The compiling method according to claim 1, further comprising a first additional step performed before said scheduling ,
said first additional step setting a sentinel instruction as an instruction corresponding to a node at the front edge of an exception dependent arc that is changed for speculative execution; and
generating an instruction sequence in said intermediate representation program so that an instruction sequence in said first intermediate representation program is re-executed without suppressing occurrence of the exception if said sentinel instruction is executed with the occurrence of the exception in the S-PEI subjected to speculative execution being suppressed.

6. The compiling method according to claim 1, further comprising a second additional step performed before said scheduling;
said second additional step setting as a check instruction an instruction corresponding to a node at the front edge of an exception dependent arc that is moved for speculative execution; and
placing as a recovery code a copy of the instruction sequence subjected to the speculative execution in a position after said check instruction;
wherein said check instruction determines whether occurrence of an exception in the H-PEI subjected to the speculative execution is suppressed; and if said determination is positive, generates an instruction sequence in said first intermediate representation program portion so that said recovery code is executed.

7. The compiling method according to claim 1, wherein said first dependency graph information includes information about setting of an exception dependent arc (hereinafter referred to as an "inter-S-PEI exception dependent arc") from an S-PEI to the next S-PET that follow the S-PEI in order,
said method further comprises third and fourth additional steps performed before said scheduling;
said third additional step removing an inter-S-PEI exception dependent arc if exceptions relating to nodes at the both ends of said inter-S-PEI exception dependent arc are of the same type, or retaining said inter-S-PEI exception dependent arc if the exceptions at the both ends of the inter-S-PEI exception dependent arc are of the different types; and
said fourth additional step including into said second dependency graph information a change to the inter-SPE-I exception dependent arc made at said third additional step.

8. A compiling apparatus comprising:
means for generating a first intermediate representation program from a source program, said first intermediate representation program being inserted with an exception check instruction (hereinafter referred to as an "S-PEI") prior to an instruction by which a program is unusually terminated (hereinafter referred to as an "H-PEI");
means for extracting a block including a plurality of sequenced instructions in written order of said first intermediate representation program;
means for generating first dependency graph information for said block, said first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;
means for determining whether or not an H-PEI node is executed more advantageously with a constraint by an exception dependent arc than without a constraint by said exception dependent arc is more advantageous, based on a criterion for determining advantage in terms of execution time;
means for generating a second dependency graph in which the front edge of the exception dependent arc is moved to another node so that an instruction sequence including said H-PEI node and one or more successive nodes that follow said H-PEI node is speculatively executed if it is determined that the H-PEI node is executed more advantageously without a constraint by the exception dependent arc than with a constraint by the exception dependency;
means for generating a second intermediate representation program including an intermediate program portion (hereinafter referred to as a "second intermediate representation portion") resulting from scheduling of an intermediate representation program portion (hereinafter referred to as a "first intermediate representation portion") corresponding to said second dependency graph information is scheduled; and
means for generating an object program based on said second intermediate representation program.

9. The compiling apparatus according to claim 8, wherein said criterion for determining advantage in terms of execution time is a criterion for determining advantage in terms of the earliest execution time of the H-PEI.

10. The compiling apparatus according to claim 8, wherein said scheduling is list scheduling for minimizing the length of a critical path of the program in the block.

11. The compiling apparatus according to claim 8, wherein said non-exception-dependencies include data dependencies and/or control dependencies.

12. The compiling apparatus according to claim 8, further comprising:
means for setting a sentinel instruction as an instruction corresponding to a node at the front edge of an exception dependent arc that is changed for speculative execution and generating an instruction sequence in said intermediate representation program so that an instruction sequence in said first intermediate representation program is re-executed without suppressing the occurrence of the exception if said sentinel instruction is executed with the occurrence of the exception in the H-PEI subjected to speculative execution being suppressed.

13. The compiling apparatus according to claim 8, further comprising:
means for setting as a check instruction an instruction corresponding to a node at the front edge of an exception dependent arc that is moved for speculative execution and placing as a recovery code a copy of the instruction sequence subjected to the speculative execution in a position after said check instruction; wherein said check instruction determines whether occurrence of an exception in the H-PEI subjected to the speculative execution is suppressed and if said determination is positive, generates an instruction sequence in said first intermediate representation program portion so that said recovery code is executed.

14. The compiling apparatus according to claim 8, comprising:
means for including information about setting of an exception dependent arc (hereinafter referred to as an "inter-S-PEI exception dependent arc") from an S-PEI to the next S-PEI that follow the S-PEI in order into said first dependency graph information; and
means for changing said second dependency graph information so that an inter-S-PEI exception dependent arc is removed if exceptions relating to nodes at the both ends of said inter-S-PEI exception dependent arc are of the same type, or said inter-S-PEI exception dependent arc is retained if the exceptions at the both ends of the inter-S-PEI exception dependent arc are of the different types.

15. An article of manufacture comprising a computer usable medium having computer readable program code means embodied therein for causing compilation, the computer readable program code means in said article of manufacture comprising computer readable program code means for causing a computer to effect the steps of:

generating a first intermediate representation program from a source program, said first intermediate representation program being inserted with an exception check instruction (hereinafter referred to as an "S-PEI") prior to an instruction by which a program is unusually terminated (hereinafter referred to as an "H-PEI");

extracting a block including a plurality of sequenced instructions in written order of said first intermediate representation program;

generating first dependency graph information for said block, said first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;

determining whether or not an H-PEI node is executed more advantageously with a constraint by an exception dependent arc than without a constraint by said exception dependency, based on a criterion for determining advantage in terms of execution time;

if it is determined that the H-PEI node is executed more advantageously without a constraint by an exception dependent arc than with a constraint by the exception dependency, generating second dependency graph in which the front edge of the exception dependent arc is moved to another node so that an instruction sequence including said H-PEI node and one or more successive nodes that follow said H-PEI node is speculatively executed;

generating a second intermediate representation program including an intermediate program portion (hereinafter referred to as a "second intermediate representation program portion") resulting from scheduling of an intermediate representation program portion (hereinafter referred to as a "first intermediate representation portion") corresponding to said second dependency graph information is scheduled;

and generating an object program based on said second intermediate representation program.

16. A program storage device readable by machine, tangibly embodying a program of instructions executable by the machine to perform method steps for compiling, said method steps comprising the steps of:

generating a first intermediate representation program from a source program, said first intermediate representation program being inserted with an exception check instruction (hereinafter referred to as an "S-PEI") prior to an instruction by which a program is unusually terminated (hereinafter referred to as an "H-PEI");

extracting a block including a plurality of sequenced instructions in written order of said first intermediate representation program;

generating first dependency graph information for said block, said first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;

determining whether or not an H-PEI node is executed more advantageously with a constraint by an exception dependent arc than without a constraint by said exception dependency, based on a criterion for determining advantage in terms of execution time;

if it is determined that the H-PEI node is executed more advantageously without a constraint by an exception dependent arc than with a constraint by the exception dependency, generating second dependency graph in which the front edge of the exception dependent arc is moved to another node so that an instruction sequence including said H-PEI node and one or more successive nodes that follow said H-PEI node is speculatively executed;

generating a second intermediate representation program including an intermediate program portion (hereinafter referred to as a "second intermediate representation program portion") resulting from scheduling of an intermediate representation program portion (hereinafter referred to as a "first intermediate representation portion") corresponding to said second dependency graph information is scheduled;

and generating an object program based on said second intermediate representation program.

17. A computer program product comprising a computer usable medium having computer readable program code means embodied therein for causing compilation, the computer readable program code means in said computer program product comprising computer readable program code means for causing a computer to effect the functions of:

generating a first intermediate representation program from a source program, said first intermediate representation program being inserted with an exception check instruction (hereinafter referred to as an "S-PEI") prior to an instruction by which a program is unusually terminated (hereinafter referred to as an "H-PEI");

extracting a block including a plurality of sequenced instructions in written order of said first intermediate representation program;

generating first dependency graph information for said block, said first dependency graph information including nodes corresponding to instructions and arcs provided between nodes having a dependent relation between them, wherein arcs (hereinafter referred to as "exception dependent arcs") corresponding to exception dependencies are differentiated from arcs (hereinafter referred to as "non-exception-dependent arcs") corresponding to dependency other than exception dependencies;

determining whether or not an H-PEI node is executed more advantageously with a constraint by an exception dependent arc than without a constraint by said exception dependency, based on a criterion for determining advantage in terms of execution time;

if it is determined that the H-PEI node is executed more advantageously without a constraint by an exception dependent arc than with a constraint by the exception dependency, generating second dependency graph in which the front edge of the exception dependent arc is moved to another node so that an instruction sequence including said H-PEI node and one or more successive nodes that follow said H-PEI node is speculatively executed;

generating a second intermediate representation program including an intermediate program portion (hereinafter referred to as a "second intermediate representation program portion") resulting from scheduling of an intermediate representation program portion (hereinafter referred to as a "first intermediate representation portion") corresponding to said second dependency graph information is scheduled;

and generating an object program based on said second intermediate representation program.

* * * * *